May 6, 1930.   J. I. MARTIN   1,757,728
RIM FOR VEHICLE WHEELS
Filed March 8, 1926
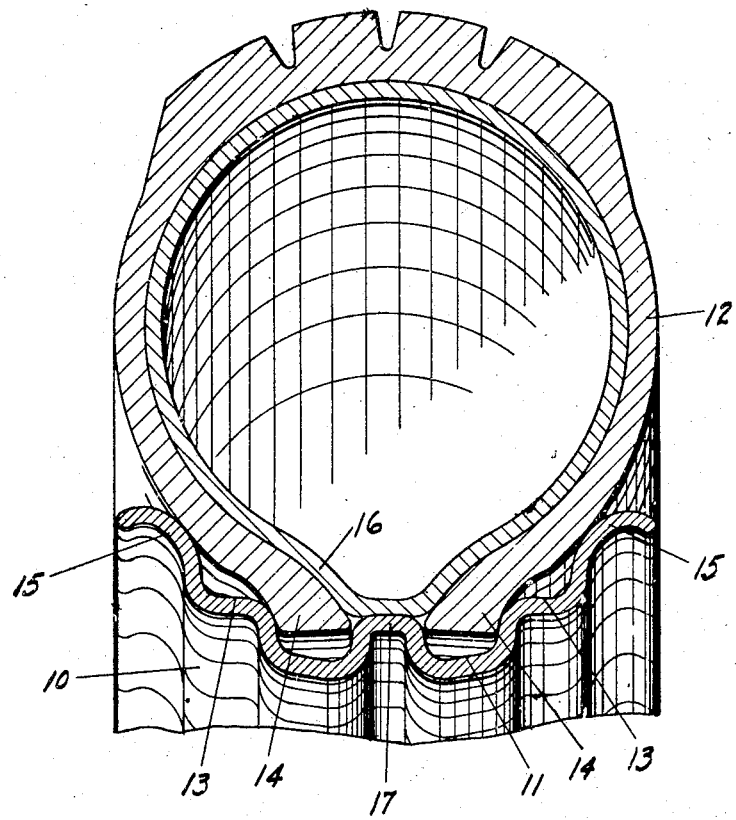
INVENTOR.
John I. Martin.
BY
ATTORNEY.

Patented May 6, 1930

1,757,728

UNITED STATES PATENT OFFICE

JOHN I. MARTIN, OF AKRON, OHIO, ASSIGNOR TO THE FIRESTONE TIRE AND RUBBER COMPANY, OF AKRON, OHIO, A CORPORATION OF OHIO

RIM FOR VEHICLE WHEELS

Application filed March 8, 1926. Serial No. 93,042.

This invention relates to the drop center type of pneumatic tire rim for vehicle wheels.

It has been found that frequently and in spite of careful instructions for mounting tires on these rims, users of drop center rims do not make sure that the beads are on the seating shoulders entirely about the rim prior to inflating the inner tube. In standard forms of drop center rims used in the past, this results in the tube "ballooning out" beneath the "toes" of the improperly mounted beads and early failure of the tube is a consequence.

The chief object of the invention is to improve upon rims of the drop center type by providing means for preventing "ballooning" of the tube under beads improperly seated on the shoulders of the rim.

In particular, the invention is directed to the formation of a raised central circumferential rib or other suitable support in the dropped center or "well" of the rim to prevent the inner tube expanding under the toe of a misplaced bead to be chafed thereby.

The foregoing and other objects are obtained by the rim disclosed in the accompanying drawing and briefly described below. It is to be understood that the invention is not limited as to the specific form thereof other than as restricted by the scope of the appended claim.

In the accompanying drawing there is disclosed a drop center rim construction embodying the invention with a pneumatic tire mounted thereon in a condition frequently existing in practice.

Referring to the drawings, 10 indicates an annular rim formed with a central well or dropped center at 11 of a circumference considerably less than the bead circumference of a tire 12 to be mounted thereon and having circumferential shoulders or seats 13, 13 of a circumference equal to that of the beads 14, 14 of the tire and also tire retaining flanges 15, 15. So far as described this is a standard drop center rim construction, the well 11 being adapted to receive the beads on one side of the rim whereby the beads can be rocked over flanges 15, 15 on the other side of the rim.

In working the tire onto the rim, necessity requires that both beads at a portion of the tire be dropped into the "well". Frequently in practice the tires are inflated with the tire in this position. Consequently with the entire breadth of well 11 unobstructed, the tube indicated at 16 will be expanded under the inflation pressure so as to "balloon out" into the well 11 under the toes of the misplaced portions of the beads 14.

Accordingly a support or stop, in its preferred form being a circumferential rib 17, is formed in rim 10 so as to project outwardly in well 11 and prevent expansion of the tube into the well into contact with the flexing toes of the misplaced beads. The rib 17 is of such dimensions as to provide grooves on both sides thereof of sufficient width to receive the beads 14 to permit the mounting of the tire on the rim in the normal manner.

It will be seen that by the invention, the great disadvantage of the use of drop center rims has been overcome in a simple and effective manner. It will also be apparent that modifications of the invention may be resorted to without departing from the spirit thereof or the scope of the invention as defined by the appended claim.

What is claimed is:

A drop center rim for vehicle wheels formed with a dropped center base portion adapted to receive a tire bead to facilitate the mounting of a tire upon, or its removal from, said rim and a raised bead seating shoulder and tire retaining flange on each side thereof, said rim having a circumferential rib projecting outwardly from said base portion and defining a bead receiving groove on each side thereof.

JOHN I. MARTIN.